(12) United States Patent
Finlay

(10) Patent No.: US 7,133,266 B1
(45) Date of Patent: *Nov. 7, 2006

(54) ELECTRICAL WIRING DEVICE

(75) Inventor: David A. Finlay, Marietta, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 88 days.

This patent is subject to a terminal disclaimer.

(21) Appl. No.: 10/884,304

(22) Filed: Jul. 2, 2004

Related U.S. Application Data

(63) Continuation of application No. 09/971,525, filed on Oct. 5, 2001, now Pat. No. 6,856,498, which is a continuation of application No. 09/718,003, filed on Nov. 21, 2000, now Pat. No. 6,522,510.

(51) Int. Cl.
H02H 9/68 (2006.01)
(52) U.S. Cl. ........................................... 361/42
(58) Field of Classification Search ................... 361/42
See application file for complete search history.

(56) References Cited

U.S. PATENT DOCUMENTS

| | | | |
|---|---|---|---|
| 4,477,857 A | 10/1984 | Crocker | |
| 5,363,083 A | 11/1994 | Fischer | |
| 5,706,155 A * | 1/1998 | Neiger et al. | 361/45 |
| 5,923,239 A | 7/1999 | Krueger et al. | |
| 6,043,966 A | 3/2000 | Krueger et al. | |
| 6,317,307 B1 | 11/2001 | Bone et al. | |
| 6,492,894 B1 | 12/2002 | Bone et al. | |
| 6,522,510 B1 * | 2/2003 | Finlay et al. | 361/42 |
| 6,587,319 B1 * | 7/2003 | Finlay, Sr. | 361/42 |
| 6,590,753 B1 * | 7/2003 | Finlay | 361/42 |
| 6,628,486 B1 * | 9/2003 | Macbeth | 361/42 |
| 6,721,156 B1 | 4/2004 | Masghati | |
| 6,724,590 B1 * | 4/2004 | Radosavljevic et al. | 361/42 |
| 6,734,769 B1 * | 5/2004 | Germain et al. | 335/6 |
| 6,788,508 B1 * | 9/2004 | Papallo et al. | 361/64 |
| 6,856,498 B1 * | 2/2005 | Finlay, Sr. | 361/42 |
| 6,867,954 B1 | 3/2005 | Wu et al. | |
| 6,937,452 B1 * | 8/2005 | Chan et al. | 361/42 |
| 7,009,473 B1 | 3/2006 | Zhang | |

(Continued)

Primary Examiner—Brian Sircus
Assistant Examiner—Boris Benenson
(74) Attorney, Agent, or Firm—Daniel P. Malley; Bond, Schoeneck & King, PLLC

(57) ABSTRACT

The present invention is directed to an electrical wiring protection device that includes a housing assembly having a hot line terminal, a neutral line terminal, a hot load terminal, and a neutral load terminal partially disposed therein. A miswire detection circuit is coupled to the hot line terminal, the neutral line terminal, the hot load terminal, and the neutral load terminal. The miswire detection circuit is configured to generate a miswire fault condition when AC power is coupled to the hot load terminal and the neutral load terminal and open circuit when AC power is coupled to the hot line terminal and neutral line terminal. A fault detection circuit is coupled to the miswire detection circuit. The fault detection circuit is configured to generate a fault detection signal in response to detecting at least one fault condition. The at least one fault condition including the miswire fault condition. An interrupting contact assembly is connected to the fault detection circuit. The interrupting contact assembly includes interrupting contacts that provide electrical continuity between the hot line terminal and the hot load terminal, and the neutral line terminal and the neutral load terminal in a reset condition. The interrupting contact assembly is also configured to open the interrupting contacts in response to receiving the fault detection signal.

51 Claims, 5 Drawing Sheets

U.S. PATENT DOCUMENTS 7,031,126 B1  4/2006  Bonilla et al.

2003/0048620 A1  3/2003  Nishimura et al.

* cited by examiner

ELECTRICAL WIRING DEVICE

CROSS-REFERENCE TO RELATED APPLICATIONS

This is a continuation of U.S. patent application Ser. No. 09/971,525 filed on Oct. 5, 2001 now U.S. Pat. No. 6,856,498, which is a continuation of Ser. No. 09/718,003 now U.S. Pat. No. 6,522,510 filed Nov. 21, 2000, the content of which are relied upon and incorporated herein by reference in its entirety, and the benefit of priority under 35 U.S.C. §120 is hereby claimed.

FIELD OF THE INVENTION

This invention pertains to the field of ground fault circuit interrupter devices, and in particular, to a ground fault interrupter device with an indicator lamp and protective circuit powered from the hot bus bar of the interrupting contacts.

BACKGROUND OF THE INVENTION

Protective devices such as ground fault circuit interrupters (GFCIs) are well known in the art. Their intent is and always has been to protect the electrical power user from electrocution when hazardous ground fault currents are present.

Historical problems with these protective devices include the possibility of line/load miswiring in the field by an installer or the eventual failure of the solenoid driving device, typically a silicon controlled rectifier, which causes the interrupter device to become inoperable while electrical power is still present, even under hazardous ground fault conditions. A variety of methods are used to prevent or attempt to prevent miswiring with varying levels of success. Preventing the problems associated with a defective solenoid driving device is inherently more difficult. Labels and installation instruction sheets have been used to prevent miswiring, but can be ignored by the installer. Solenoid burn-out has been revealed by testing the protective device with a test button, but the result of the test can be ignored by the user.

SUMMARY OF THE INVENTION

Briefly stated, an AC power line protection device which includes a protection circuit which guards against miswiring also has an indicator lamp which lights when the device is in the tripped condition and turns off when the device is reset. If the device is miswired after having been wired properly, the indicator lamp does not light when the device is tripped, and so provides a supplemental indication of miswiring. The protection circuit is powered from the hot line bus bar. The indicator lamp is also powered via the hot line bus bar of the interrupting contacts to meet safety standards.

One aspect of the present invention is directed to an electrical wiring protection device that includes a housing assembly having a hot line terminal, a neutral line terminal, a hot load terminal, and a neutral load terminal partially disposed therein. A miswire detection circuit is coupled to the hot line terminal, the neutral line terminal, the hot load terminal, and the neutral load terminal. The miswire detection circuit is configured to generate a miswire fault condition when AC power is coupled to the hot load terminal and the neutral load terminal and open circuit when AC power is coupled to the hot line terminal and neutral line terminal. A fault detection circuit is coupled to the miswire detection circuit. The fault detection circuit is configured to generate a fault detection signal in response to detecting at least one fault condition. The at least one fault condition including the miswire fault condition. An interrupting contact assembly is connected to the fault detection circuit. The interrupting contact assembly includes interrupting contacts that provide electrical continuity between the hot line terminal and the hot load terminal, and the neutral line terminal and the neutral load terminal in a reset condition. The interrupting contact assembly is also configured to open the interrupting contacts in response to receiving the fault detection signal.

In another aspect, the present invention includes a method for detecting a miswire condition in an electric circuit. The method includes coupling a protection device to the electric circuit. The protection device includes a housing assembly including a hot line terminal, a neutral line terminal, a hot load terminal, and a neutral load terminal partially disposed therein. Interrupting contacts are configured to provide electrical continuity between the hot line terminal and the hot load terminal, and the neutral line terminal and the neutral load terminal in a reset condition and trip in response to receiving a fault detection signal, whereby the electrical continuity between the hot line terminal and the hot load terminal, and the neutral line terminal and the neutral load terminal is interrupted. The method also includes the step of detecting a miswire condition when the AC power is coupled to the hot load terminal and the neutral load terminal. A fault detection signal is generated in response to the step of detecting a miswire condition when the AC power is coupled to the hot load terminal and the neutral load terminal. The interrupting contacts are tripped in response to the fault detection signal, whereby the electrical continuity between the hot line terminal and the hot load terminal, and the neutral line terminal and the neutral load terminal is interrupted. The interrupting contacts are reset to restore electrical continuity between the hot line terminal and the hot load terminal, and the neutral line terminal and the neutral load terminal. The steps of detecting, generating, and tripping are repeated if the AC power is coupled to the hot load terminal and the neutral load terminal.

In another aspect, the present invention includes an electrical wiring protection device that includes a housing assembly including a hot line terminal, a neutral line terminal, a hot load terminal, and a neutral load terminal partially disposed therein. A fault detection circuit is coupled to the hot line terminal, the neutral line terminal, the hot load terminal, and the neutral load terminal. The fault detection circuit is configured to generate a fault detection signal in response to detecting at least one fault condition. An interrupting contact assembly is connected to the fault detection circuit. The interrupting contact assembly includes interrupting contacts that provide electrical continuity between the hot line terminal and the hot load terminal, and the neutral line terminal and the neutral load terminal in a reset condition. The interrupting contact assembly is configured to open the interrupting contacts in response to receiving the fault detection signal. An indicator circuit is coupled to the interrupting contact assembly and the fault detection circuit. The indicator circuit is configured to indicate a trip condition, a miswire condition, and an end-of-life condition.

In another aspect, the present invention includes an electrical wiring protection device that includes a housing assembly including a hot line terminal, a neutral line terminal, a hot load terminal, and a neutral load terminal partially disposed therein. A miswire detection circuit is coupled to the hot line terminal, the neutral line terminal, the hot load terminal, and the neutral load terminal. The miswire detection circuit is configured to generate a miswire fault condition when AC power is coupled to the hot load terminal and the neutral load terminal and open circuit when AC power is coupled to the hot line terminal and neutral line terminal. A fault detection circuit is coupled to the miswire detection circuit. The fault detection circuit is configured to generate a fault detection signal in response to detecting at least one fault condition. The at least one fault condition includes the miswire fault condition. An interrupting contact assembly is connected to the fault detection circuit. The interrupting contact assembly includes interrupting contacts that provide electrical continuity between the hot line terminal and the hot load terminal, and the neutral line terminal and the neutral load terminal in a reset condition. The interrupting contact assembly is configured to open the interrupting contacts in response to receiving the fault detection signal. An indicator circuit is coupled to the interrupting contact assembly and the fault detection circuit. The indicator circuit is configured to indicate a trip condition, a miswire condition, and an end-of-life condition.

In yet another aspect, the present invention includes a method for manufacturing an electrical wiring device. The method includes assembling the electrical wiring device. The electrical wiring device includes a housing assembly including a hot line terminal, a neutral line terminal, a hot load terminal, and a neutral load terminal partially disposed therein. A miswire detection circuit is coupled to the hot line terminal, the neutral line terminal, the hot load terminal, and the neutral load terminal. The miswire detection circuit includes a switch configured to disable the miswire detection circuit in an open state. The miswire detection circuit is configured to generate a miswire fault condition when the switch is in a closed state. The miswire fault condition is generated when AC power is coupled to the hot load terminal and the neutral load terminal and open circuit when AC power is coupled to the hot line terminal and neutral line terminal. A fault detection circuit is coupled to the miswire detection circuit. The fault detection circuit is configured to generate a fault detection signal in response to detecting at least one fault condition. The at least one fault condition includes the miswire fault condition. Interrupting contacts are configured to provide electrical continuity between the hot line terminal and the hot load terminal, and the neutral line terminal and the neutral load terminal in a reset condition and trip in response to receiving a fault detection signal, whereby the electrical continuity between the hot line terminal and the hot load terminal, and the neutral line terminal and the neutral load terminal is interrupted. The method also includes the step of opening the switch to thereby disable the miswire detection circuit. At least one test is performed on the electrical wiring device. The switch is closed to thereby enable the miswire detection circuit.

In yet another aspect, the present invention includes an electrical wiring device that includes a housing assembly having line terminals and load terminals partially disposed therein. A fault detection circuit is coupled to the line terminals and/or the load terminals. The fault detection circuit is configured to generate a fault detection signal in response to detecting at least one fault condition. A wiring detection circuit is coupled to the line terminals and/or the load terminals. The wiring detection circuit includes at least one electrical component in series with a switch. The at least one electrical component is coupled to a control input of a silicon controlled rectifier. The wiring detection circuit is configured to propagate a current signal through the at least one electrical component when the switch is closed and power is applied to the line terminals. An interrupting contact assembly is connected to the fault detection circuit and the wiring detection circuit. The interrupting contact assembly includes interrupting contacts configured to provide electrical continuity between the line terminals and the load terminals in a closed state and open the interrupting contacts in response to receiving the fault detection signal. The interrupting contact assembly is in the open state absent the current signal flowing through the at least one electrical component.

In yet another aspect, the present invention includes an electrical wiring device that includes a housing assembly including line terminals and load terminals partially disposed therein. At least one detection circuit is coupled to the line terminals and/or the load terminals. The at least one detection circuit is configured to generate a signal in response to detecting a correct wiring condition. An interrupting contact assembly is coupled to the at least one detection circuit. The interrupting contact assembly includes interrupting contacts that are configured to provide electrical continuity between the line terminals and the load terminals in a closed state and interrupt the electrical continuity in an open state. The interrupting contact assembly is in the open state absent the signal being provided by the at least one detection circuit.

In yet another aspect, the present invention includes an electrical wiring device that includes a housing assembly including line terminals and load terminals partially disposed therein. An interrupting contact assembly is coupled to the line terminals and the load terminals. The interrupting contact assembly includes a trip solenoid coupled to interrupting contacts. The interrupting contacts are configured to provide electrical continuity between the line terminals and the load terminals in a reset state and interrupt the electrical continuity in an open state. At least one detection circuit is configured to detect power coupled to the line terminals. The detection circuit permits the interrupting contacts to be driven into the reset state without an enabling signal being received from the trip solenoid.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENT

Figure 1:
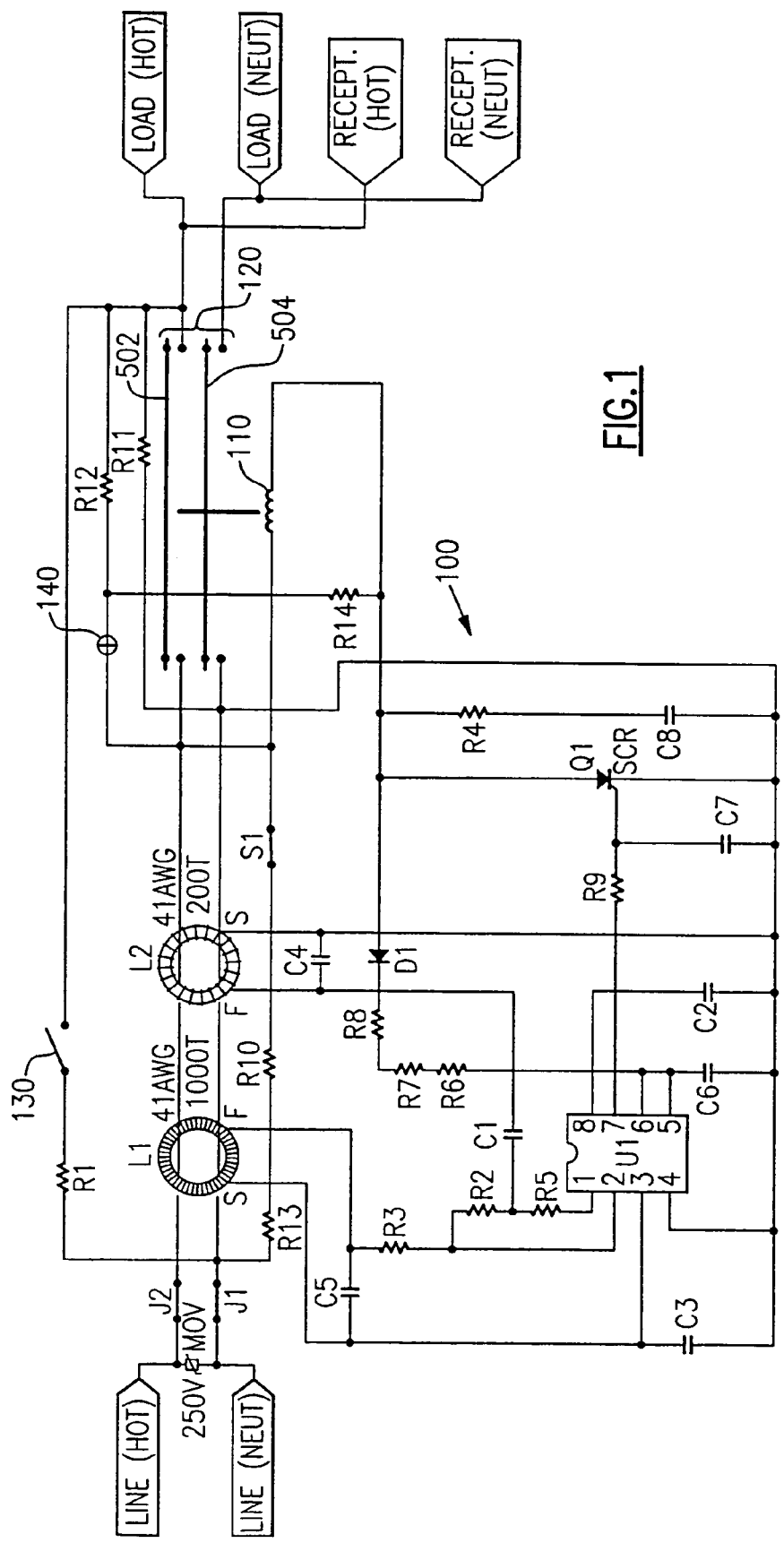
FIG. 1 shows a schematic of a GFCI circuit with miswire protection and an indicator lamp according to an embodiment of the invention.

Referring to FIG. 1, a GFCI circuit is shown generally at 100. When a differential transformer L1 senses unequal amounts of current flowing in the hot and neutral conductors due to a ground fault condition, circuit 100 causes a breaker coil 110 to activate, opening circuit interrupting mechanism 120. Circuit interrupting mechanism 120 conventionally includes hot and neutral bus bars 502, 504 that make and break contact with the hot and neutral power lines, respectively, via contacts located on both the bus bars and power lines at the four contact points. A test button 130 induces a simulated ground fault when pushed in and causes breaker coil 110 to activate.

This improved GFCI contains two unique features that address the problems noted in the background section. The first is a miswire circuit which uses a fault resistance R10, R13 creating a differential current on the primary of the differential current transformer L1 that exceeds the level of differential current that the GFCI has been designed to interrupt, typically 6 milliamperes. The fault resistance R10, $13 is on the line side of interrupting contacts 120 electrically located between the line and load terminals of the hot and neutral wire paths. The ground fault circuit sensing electronics of GFCI circuit 100 derives power from the line side terminals of the GFCI.

Should the GFCI be wired in a mode where power is supplied to the load terminals, i.e., miswired, if the GFCI is tripped, nothing visible happens. If the GFCI is in the reset condition, it will immediately trip when powered. In this mode, the current flowing through the fault resistance R10, R13, derived from the line terminal side of the device, is interrupted when the device trips. The estimated time it takes for the fault resistors R10, R13 to "clear" or burn out is greater than 50 ms and typically 300 ms. Because the trip time of the GFCI is less than or equal to 25 ms, fault resistors R10, R13 do not have enough time to clear. If one attempts to reset the device when in the miswired condition, the device immediately trips out again, and this continues until such time as the device is wired correctly, that is, when power is applied to the GFCI at the line terminals. This effectively results in a GFCI that will not operate, i.e., be able to be reset, until such time as the device is properly wired.

When electrical power is connected in a correct manner to the line terminals, a differential current is created by the fault resistance R10, R13 when power is applied to the device. If the device is reset before power is applied, the device trips as a result of this differential current. If the device is already in the tripped condition before power is applied, nothing visible happens. However, because the fault resistor is on the line side of the interrupting contacts 120, current through fault resistance R10, R13 continues to flow, regardless of interrupting contacts 120 being open. This internal differential current, created by the fault resistance R10, R13 clears itself in a short time, typically 300 ms. This can be accomplished by selecting a resistor or resistors whose power rating is greatly exceeded by the current, such that the resistor or resistors open. Another option is to provide a fuse (F1 in FIG. 3) in series with the fault resistance R10, R13 with a properly selected $I^2t$ rating so that the fuse blows instead of the fault resistance R10, R13. The term "resistive element" as used herein refers to either a resistance or a fuse. Once the device has been properly wired with power connected to the line terminals and the fault has been cleared, the device can be reset and provide its normal protective functions.

Two interesting issues with this miswire protection concept are how to perform the Underwriters Laboratories Standard 943 required tests during manufacturing of the protective device without the differential current produced by the fault resistor affecting the test results, or causing the fault resistor to clear in the manner previously described. A solution is to place a normally closed switch S1 in series with the fault resistance R10, R13 previously described as producing the differential current. This switch S1 is preferably a flexible conductive spring arm that normally rests against a contact on the top side of the printed circuit board. Directly below the spring arm of switch S1 is a hole in the printed circuit board, and below this hole is another hole in the plastic back body of the GFCI device. When the GFCI is loaded into a piece of test equipment designed to perform the required manufacturing tests, a mechanical test probe engages the spring arm of switch S1 through the two aforementioned holes, causing the spring arm of switch S1 to be pushed away from the contact and therefore opening the differential current circuit path. Manufacturing testing can now be performed without any circuit effect from this path, without burning out fault resistance R10, R13. The last test performed on the GFCI device in the test sequence is to disengage the probe from the spring arm of switch S1, which reconnects the differential current circuit path. Line voltage is then applied to the load contacts. The differential current causes the GFCI to trip, thereby checking the integrity of the differential current circuit path and components.

The second feature of this improved GFCI is a light with multiple indication meanings. The circuit in FIG. 1 includes resistors R11, R12, R14, and an indication device, shown on the schematic as neon light 140. The first function of light 140 is as a trip indicator. The light is off if the GFCI is in the reset condition, and illuminates if the GFCI trips. The second function of light 140 is to indicate miswiring. A third function of light 140 is to notify the user that the solenoid-driving device is defective and that the GFCI is no longer operational.

The indicating circuit works as follows. When the GFCI is wired properly, a i.e., power from the supply source is connected to the line terminals and not the load terminals, and the device is reset, light 140 is off, as the line disconnecting contacts 120 are closed, resulting in no voltage across light 140 and resistor R12. If the GFCI trips for any reason, light 140 energizes as a result of line voltage being applied across light 140 and resistors R12 and R11. When the device is reset, voltage is removed and light 140 turns off. If the device is miswired for any reason, light 140 is off when the GFCI is reset, but when the device trips in this condition, there is not return path to neutral through resistor R11, and light 140 does not turn on as it would if the GFCI were wired properly. This feature is not dependent on the fault resistance R10, R13; therefore, if the miswire detection circuit has been previously used and the fault resistance cleared, miswire detection is still possible by exercising this light in conjunction with tripping out the GFCI.

Indicating a defective solenoid driving device, such as SCR Q1, is achieved with the addition of a resistor R14. With resistor R14 in the circuit, light 140 energizes when the SCR Q1 short circuits and a path to supply neutral develops. When this occurs, and the device is reset, the GFCI trips, energizing light 140 through resistor R14. Continuously applied line voltage to the solenoid occurring as a result of a shorted SCR Q1 causes the trip solenoid (coil 110) to open within a few seconds. Coil 110 burns out since it is continuously energized, so it cannot trip again after the device is reset. When the GFCI is reset in this condition, light 140 remains energized, indicating a defective solenoid driving device. The value of resistor R14 must be kept low relative to the value of resistor R12 as a voltage divider occurs between resistors R12 and R14 which limits the voltage across light 140. A neon lamp needs a minimum of about 60 volts to arc over and energize. A value of 33K for resistor R14 is suitable for this embodiment, which provides for about 66 volts across the neon lamp at a worst case line voltage of 102 VAC. Computing different values for resistors R11, R12, and R14 based on different types of lights 140 is considered within the capabilities of one skilled in the art.

Figure 2:
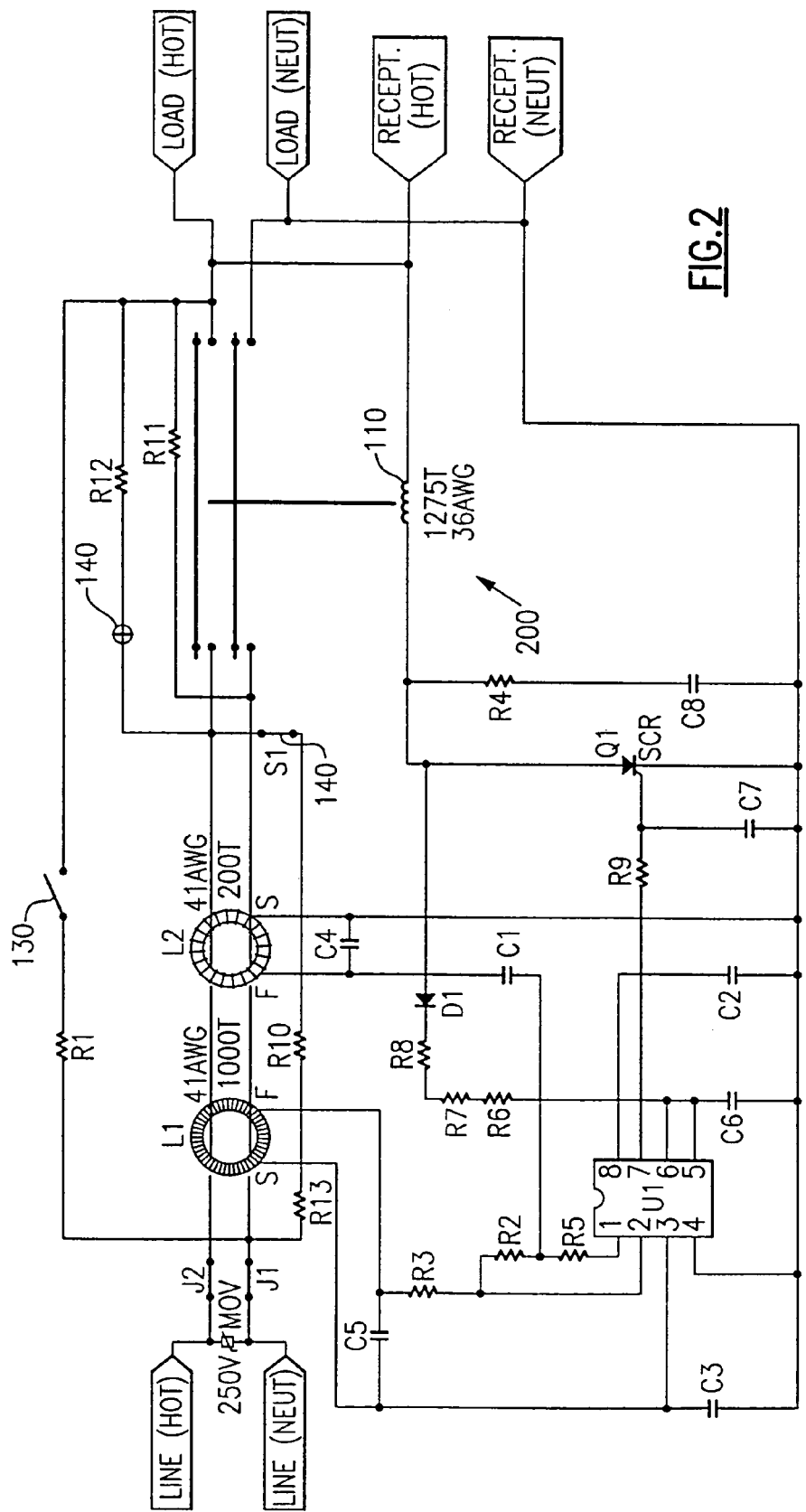
FIG. 2 shows a schematic of a lockout configuration according to an embodiment of the invention.

Referring to FIG. 2, an embodiment of the invention is shown at 200 in which the protection device cannot be rest if the SCR shorts out, i.e., the device is "locked out." This is because breaker coil 110 draws its power from the load sides of contacts 120 instead of the line side as in the embodiment of FIG. 1. When the SCR shorts out, breaker coil 110 immediately trips and opens contacts 120. Opening contacts 120 breaks the current to the load side of the device, so breaker coil 110 is de-energized, preventing it from burning out. When attempting to reset the device, breaker coil 110 immediately trips out contacts 120, thus preventing the device from being reset. Since the device cannot be reset, resistor R14 is not used in this embodiment because there is no need to indicate via light 140 that the device has a faulty SCR; the inability to reset the device signals that condition.

Figure 3:
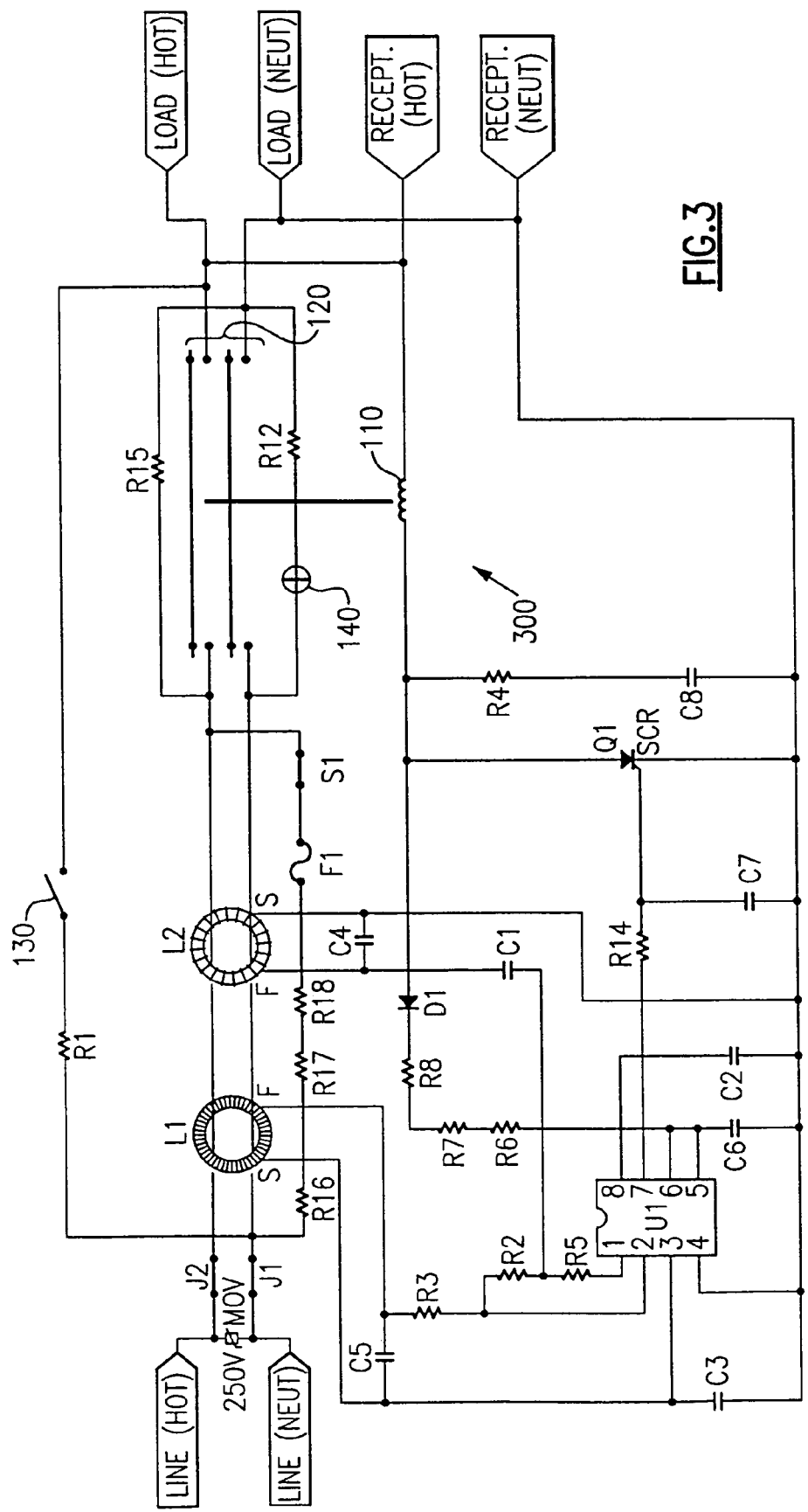
FIG. 3 shows a schematic of an alternative lockout configuration according to an embodiment of the invention.

Referring to FIG. 3, an alternative lock-out embodiment is shown at 300 which shows the series combination of light 140 and resistor R12 connected in parallel to the neutral conductor contact instead of the hot conductor contact as is the case in FIGS. 1 and 2. A resistor R15 completes the light circuit from load neutral to line hot. The miswire circuit fault resistance is shown here as resistors R16, R17, and R18 in series with fuse F1. This embodiment eliminates any trickle current that might be flowing if the device is miswired.

Figure 4:
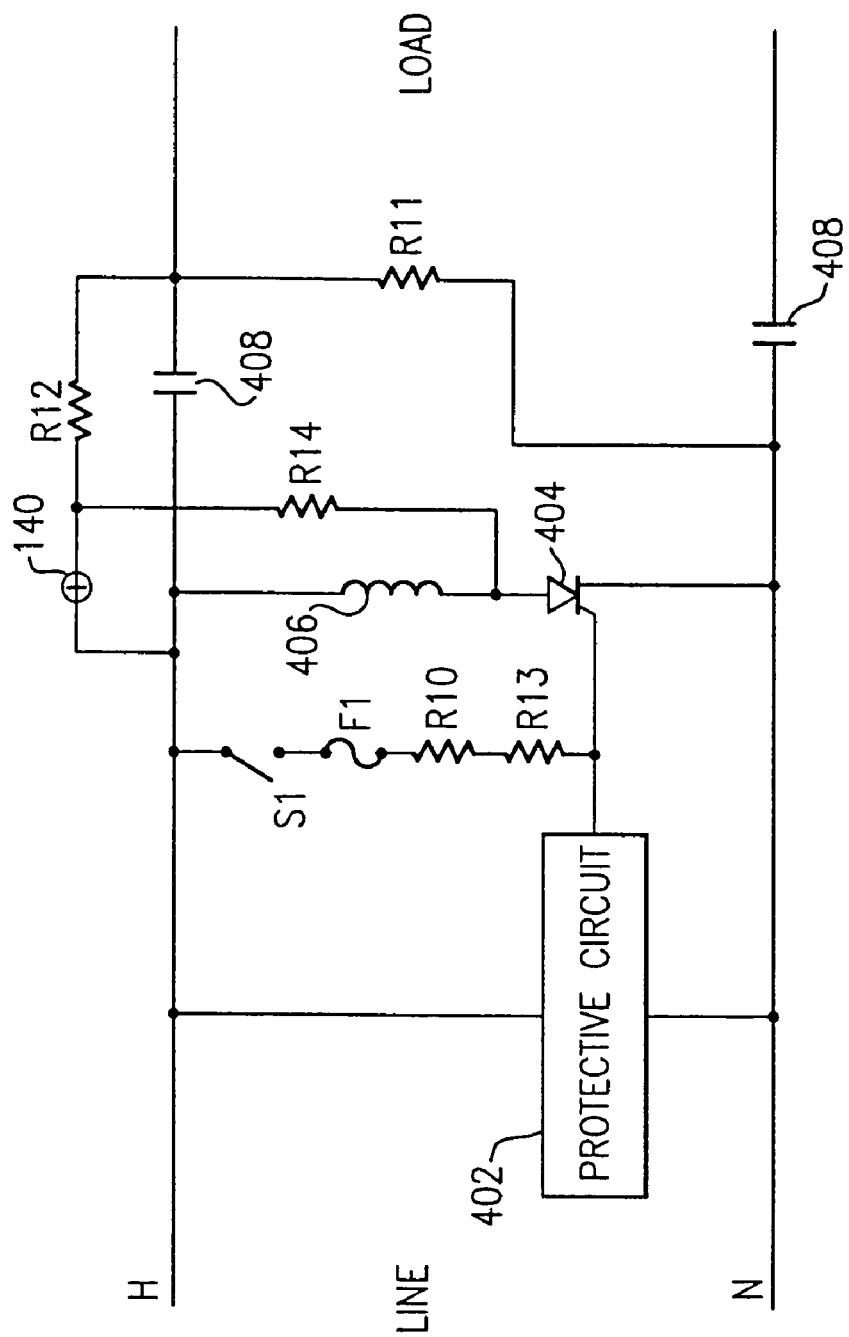
FIG. 4 shows a schematic of a protective circuit with miswire protection and an indicator lamp according to an embodiment of the invention.

Referring to FIG. 4, an embodiment of the invention is shown at 400 in which the protection device can be reset if the SCR shorts out. The embodiment is similar to the one shown in FIG. 1 except that it is generalized to apply to different protective devices such as ground fault circuit interrupters (GFCI's) or devices intended to interrupt ground faults from personnel contact with a power line conductor, arc fault circuit interrupters (AFCI's) intended to interrupt line current which if allowed to continue could cause an electrical fire, combination devices that provide both AFCI and GFCI protection, or the like.

According to this embodiment, the protective devices mentioned have a protective circuit 402 that detects the respective fault condition, turning on an electronic switching device such as SCR 404, energizing a solenoid 406 coil which receives power from the line conductors, to open interrupting contacts 408. Resistors R11, R12, R14, fault resistors R10, R13, normally closed switch S1, fuse F1, and light 140 have the same functions as previously described in the above embodiments. When power is miswired to the load terminals and the protective device is reset such that interrupting contacts 408 are closed, current flows are normally closed switch S1, fuse F1, fault resistors R10, R13 and the gate-cathode junction of SCR 404, energizing solenoid 406 and tripping the interrupting contacts 408. Fuse F1 and fault resistors R10, R13 are chosen to withstand the current flow for the time that power is applied to the load terminals to the moment when interrupting contacts 408 open, approximately 25 milliseconds. If line power is connected as intended to the line terminals of the protective device, current flows through normally closed switch S1, fuse F1, fault resistors R10, R13, and the gate cathode junction of SCR 404 until such time as fuse F1 clears, after which it is possible to accomplish a resetting of the interrupting contacts 408. Solenoid 406 is designed not to burn out during the interval that SCR 404 is conductive, which interval is designed to be approximately 100 milliseconds. In this manner the protective functions described in FIG. 1 are provided without necessarily requiring a differential current transformer L1 in the construction of the protective device nor attachment of the fault resistor and fuse circuit to both the hot and neutral line conductors. If an electronic switching device other than an SCR is used, e.g., a bipolar transistor, the connections shown here are being made to the gate of the SCR would instead be made to the base of the bipolar transistor. "Gate" and "base" are intended to have an equivalent meaning in this specification and claims.

There are several problems with the above embodiments from a regulatory and safety viewpoint. For example, there is a high voltage dielectric test requirement in the present UL Standard. This test is performed by applying a high voltage potential between line hot and load hot (and again between line neutral and load neutral) with the GFCI in the tripped condition. The light indication circuit connection between line and load hot in the previous embodiments would cause this test to fail. Another problem is that the circuit is subject to a maximum "leakage" current of 0.5 ma. This maximum allowable current is not sufficient to drive an LED to achieve the desired light output in the indicator light. A further problem is that the mechanical embodiment of the GFCI is subjected to a reset button "tease" test if the circuit power is derived from the load side contacts. The test is performed by placing an ohmmeter across each set of contacts and then slowly releasing the reset button during the rest sequence to see if there is a point at which one contact closes while the other remains open. The required mechanical structure to pass the tease test must be kept in mind when designing the electrical circuit portion of the protection device. These problems are solved by the next embodiment.

Figure 5:
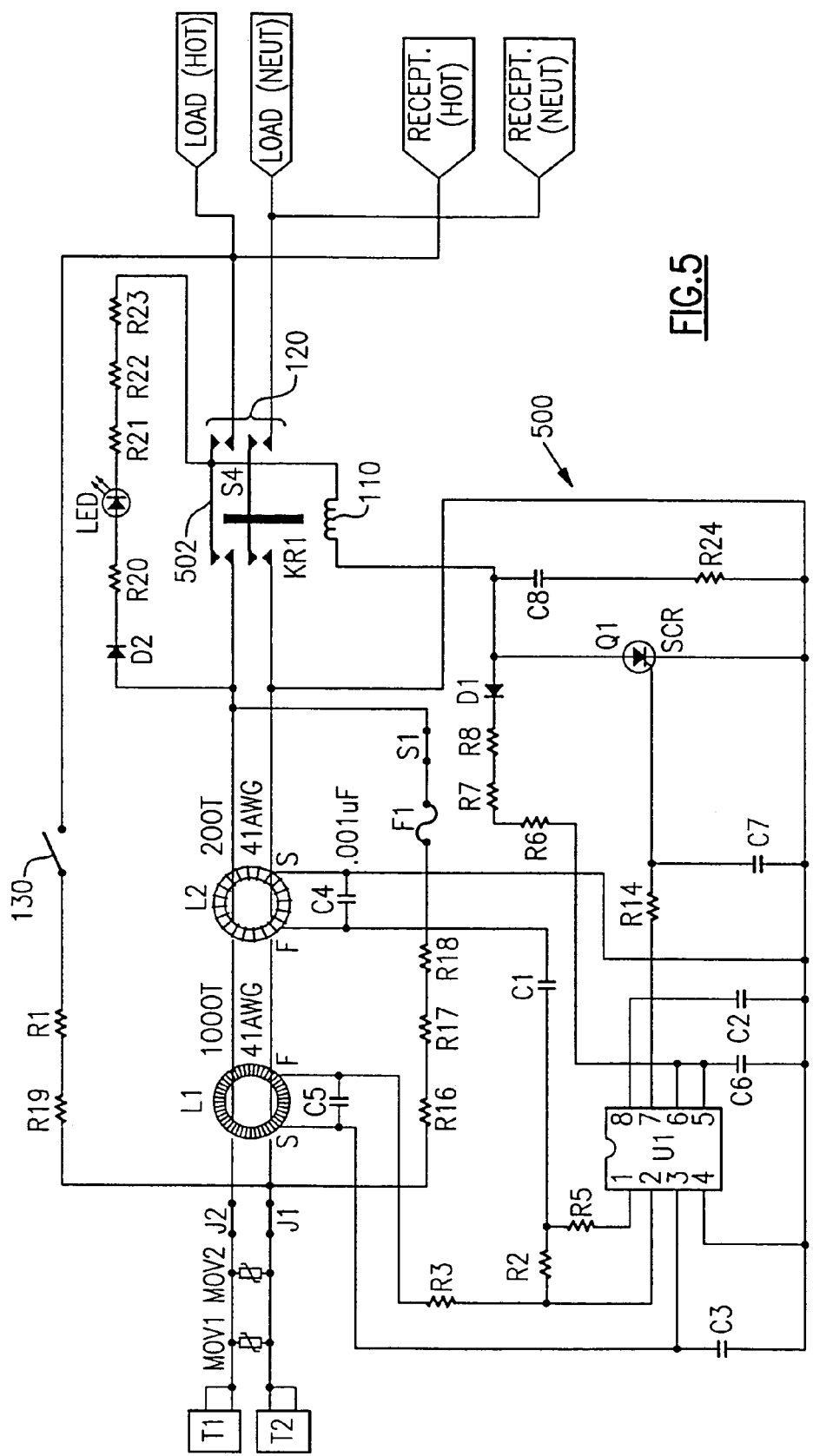
FIG. 5 shows a schematic of a protective circuit with miswire protection and an indicator lamp according to an embodiment of the invention.

Referring to FIG. 5, a circuit 500 is shown in which circuit power is derived from hot bus bar 502 of the tripping mechanism. Circuit 500 still meets the original circuit requirements of removing power to the SCR when the SCR shorts. When power is applied and the GFCI is in the reset condition, bus bar 502 is in contact with the line hot, so the circuit is powered. When a ground fault is senses by differential transformer L1, the GFCI device of this embodiment trips normally.

Another function of the original circuit was to have an indicator light that came on as a result of the GFCI tripping when the GFCI was correctly wired, but when the GFCI was miswired by bringing power to the load contacts, the indicator light would not energize when the GFCI was tripped. The indicator circuit of this embodiment includes a diode D2 in series with resistors R20, R21, R22, and R23, and an LED. When the properly wired GFCI trips and the SCR is not shorted out, bus bar 502 which provides power to circuit 500 is removed from contact with line hot. Current then flows through the indicator circuit, coil 110, diode D1, and resistors R6, R7, R8 to provide the power to illuminate the LED. Nominal current through the LED is about 4 ma.

The indicator circuit works in conjunction with the GFCI sense circuitry to power the indicator and to protect coil 110 in the event that the SCR shorts out. When the properly wired GFCI trips due to the SCR shorting, current still flows through the indicator circuit, coil 110, and then through the shorted SCR. Nominal current in this scenario is about 10 ma. Coil 110 is protected from burning out by the resistor chain R20, R21, R22, and R23. Diode D1 serves to half wave rectify the voltage for circuit 500, protects the LED from breaking over in the reverse direction when the GFCI is tripped, and halves the power across resistor chain R20, R21, R22, and R23 when the SCR shorts out.

When the GFCI is miswired, i.e., when the power is applied to the load terminals of the device instead of the line terminals of the device, the LED cannot light because there is no path for the current to take when the device is tripped. Thus, if the device is tripped and no light appears, the installer knows that the device is miswired.

Although the invention is described with respect to a GFCI, the invention is equally applicable to an AFCI or indeed to any circuit interrupting device.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An electrical wiring protection device comprising:
   a hot line terminal, a neutral line terminal, a hot load terminal, and a neutral load terminal;
   a miswire detection circuit coupled to the hot line terminal, the neutral line terminal, the hot load terminal, and the neutral load terminal, the miswire detection circuit being configured to generate a miswire fault condition when AC power is coupled to the hot load terminal and the neutral load terminal and open circuit when AC power is coupled to the hot line terminal and neutral line terminal;
   a fault detection circuit coupled to the miswire detection circuit, the fault detection circuit being configured to generate a fault detection signal in response to detecting at least one fault condition, the at least one fault condition including the miswire fault condition; and
   an interrupting contact assembly connected to the fault detection circuit, the interrupting contact assembly including interrupting contacts that provide electrical continuity between the hot line terminal and the hot load terminal, and the neutral line terminal and the neutral load terminal in a reset condition, the interrupting contact assembly being configured to open the interrupting contacts in response to receiving the fault detection signal.

2. The device of claim 1, wherein the miswire detection circuit further comprises a switch element, the switch being configured to disable the miswire detection circuit in an open state.

3. The device of claim 2, wherein the miswire detection circuit is enabled when the switch is in a closed state.

4. The device of claim 1, wherein the miswire detection circuit includes at least one fusible element configured to open-circuit when the AC power is coupled to the hot line terminal and neutral line terminal.

5. The device of claim 4, wherein the fusible element includes at least one resistor.

6. The device of claim 1, wherein the miswire fault condition generates a differential current.

7. The device of claim 1, wherein the interrupting contact assembly further comprises:
   a rectifier element coupled to the fault detection circuit, the rectifier element being turned ON in response to the fault detection signal; and
   a coil element coupled between the rectifier element and the interrupting contacts, the coil element being configured to trip the interrupting contacts when the rectifier in the ON state.

8. The device of claim 7, further comprising an indicator circuit coupled to the rectifier element, the indicator circuit being energized when the rectifier is short circuited to thereby indicate an end-of-life condition.

9. The device of claim 1, wherein the interrupting contact assembly further comprises:
   a rectifier element coupled to the fault detection circuit, the rectifier element being turned ON in response to the fault detection signal;
   a coil element coupled between the rectifier element and the hot load terminal, the coil element being configured to trip the interrupting contacts when the rectifier in the ON state; and
   an indicator element coupled between the neutral line terminal and the hot load terminal, the indicator element being configured to indicate a trip condition, a miswire condition, and an end-of-life condition.

10. The device of claim 9, wherein the indicator element is energized to provide an trip condition indicator.

11. A method for detecting a miswire condition in an electric circuit, the electric circuit being configured to propagate power, the method comprising:
    coupling a protection device to the electric circuit, the protection device including line terminals and load terminals partially disposed therein, and interrupting contacts configured to provide electrical continuity between the line terminals and the load terminals in a reset state and configured to trip in response to receiving a fault detection signal, whereby the electrical continuity between the line terminals and the load terminals is interrupted;
    detecting a miswire condition when the power is connected to the load terminals;
    generating a fault detection signal in response to the step of detecting a miswire condition;
    tripping the interrupting contacts in response to the fault detection signal, whereby the electrical continuity between the line terminals and the load terminals is interrupted;
    resetting the interrupting contacts to restore electrical continuity between the line terminals and the load terminals; and
    repeating the steps of detecting, generating, and tripping if the power is connected to the load terminals.

12. The method of claim 11, wherein the miswire condition is generated by directing current into a conductive path coupled to the line terminals and the load terminals, the conductive path including at least one fusible element.

13. The method of claim 12, further comprising the step of opening the at least one fusible element when the AC power is coupled to the line terminals.

14. The method of claim 12, further comprising:
    coupling the power to the line terminals, whereby current is directed into the conductive path;
    tripping the interrupting contacts in response to the current within a first predetermined time period is elapsed;

opening the at least one fusible element after a second predetermined time period is elapsed, the second predetermined time period being greater than the first predetermined time period; and resetting the interrupting contacts to restore electrical continuity between the line terminals and the load terminals.

15. The method of claim 13, wherein the step of repeating is not performed if power is coupled to the line terminals.

16. An electrical wiring protection device comprising:
a hot line terminal, a neutral line terminal, a hot load terminal, and a neutral load terminal;
a fault detection circuit coupled to the hot line terminal, the neutral line terminal, the hot load terminal, and the neutral load terminal, the fault detection circuit being configured to generate a fault detection signal in response to detecting at least one fault condition;
an interrupting contact assembly connected to the fault detection circuit, the interrupting contact assembly including interrupting contacts that provide electrical continuity between the hot line terminal and the hot load terminal, and the neutral line terminal and the neutral load terminal in a reset condition, the interrupting contact assembly being configured to open the interrupting contacts in response to receiving the fault detection signal; and
an indicator circuit coupled to the interrupting contact assembly and the fault detection circuit, the indicator circuit being configured to indicate a trip condition, a miswire condition, and an end-of-life condition.

17. The device of claim 16, further comprising a miswire detection circuit coupled to the hot line terminal, the neutral line terminal, the hot load terminal, and the neutral load terminal, the miswire detection circuit being configured to generate a miswire fault condition when AC power is coupled to the hot load terminal and the neutral load terminal and open circuit when AC power is coupled to the hot line terminal and neutral line terminal, the at least one fault condition including the miswire fault condition.

18. The device of claim 17, wherein the miswire detection circuit further comprises a switch element, the switch being configured to disable the miswire detection circuit in an open state.

19. The device of claim 18, wherein the miswire detection circuit is enabled when the switch is in a closed state.

20. The device of claim 17, wherein the fusible element includes at least one resistor.

21. The device of claim 16, wherein the interrupting contact assembly further comprises:
a rectifier element coupled to the fault detection circuit and the indicator circuit, the rectifier element being energized in response to the fault detection signal, the indicator circuit being energized by the rectifier to signal the tripped condition; and
a coil element coupled between the rectifier element and the interrupting contacts, the coil element being configured to trip the interrupting contacts when the rectifier is energized.

22. The device of claim 21, wherein the indicator circuit is energized in response to the rectifier element being short circuited to thereby indicate an end-of-life condition.

23. An electrical wiring protection device comprising:
a hot line terminal, a neutral line terminal, a hot load terminal, and a neutral load terminal;
a miswire detection circuit coupled to the hot line terminal, the neutral line terminal, the hot load terminal, and the neutral load terminal, the miswire detection circuit being configured to generate a miswire fault condition when AC power is coupled to the hot load terminal and the neutral load terminal and open circuit when AC power is coupled to the hot line terminal and neutral line terminal;
a fault detection circuit coupled to the miswire detection circuit, the fault detection circuit being configured to generate a fault detection signal in response to detecting at least one fault condition, the at least one fault condition including the miswire fault condition;
an interrupting contact assembly connected to the fault detection circuit, the interrupting contact assembly including interrupting contacts that provide electrical continuity between the hot line terminal and the hot load terminal, and the neutral line terminal and the neutral load terminal in a reset condition, the interrupting contact assembly being configured to open the interrupting contacts in response to receiving the fault detection signal; and
an indicator circuit coupled to the interrupting contact assembly and the fault detection circuit, the indicator circuit being configured to indicate a trip condition, a miswire condition, and an end-of-life condition.

24. A method for manufacturing an electrical wiring device, the method comprising:
assembling the electrical wiring device, the electrical wiring device including
a hot line terminal, a neutral line terminal, a hot load terminal, and a neutral load terminal,
a miswire detection circuit coupled to the hot line terminal, the neutral line terminal, the hot load terminal, and the neutral load terminal, the miswire detection circuit including a switch configured to disable the miswire detection circuit in an open state, the miswire detection circuit being configured to generate a miswire fault condition when the switch is in a closed state, the miswire fault condition being generated when AC power is coupled to the hot load terminal and the neutral load terminal and open circuit when AC power is coupled to the hot line terminal and neutral line terminal,
a fault detection circuit coupled to the miswire detection circuit, the fault detection circuit being configured to generate a fault detection signal in response to detecting at least one fault condition, the at least one fault condition including the miswire fault condition, and
interrupting contacts configured to provide electrical continuity between the hot line terminal and the hot load terminal, and the neutral line terminal and the neutral load terminal in a reset condition and trip in response to receiving a fault detection signal, whereby the electrical continuity between the hot line terminal and the hot load terminal, and the neutral line terminal and the neutral load terminal is interrupted;
opening the switch to thereby disable the miswire detection circuit;
performing at least one test on the electrical wiring device; and
closing the switch to thereby enable the miswire detection circuit.

25. An electrical wiring device comprising:
line terminals and load terminals;
a fault detection circuit coupled to the line terminals and/or the load terminals, the fault detection circuit being configured to generate a fault detection signal in response to detecting at least one fault condition;

a wiring detection circuit coupled to the line terminals and/or the load terminals, the wiring detection circuit including at least one electrical component in series with a switch, the at least one electrical component being coupled to a control input of a silicon controlled rectifier, the wiring detection circuit being configured to propagate a current signal through the at least one electrical component when the switch is closed and power is applied to the line terminals; and an interrupting contact assembly connected to the fault detection circuit and the wiring detection circuit, the interrupting contact assembly including interrupting contacts configured to provide electrical continuity between the line terminals and the load terminals in a closed state and configured to open the interrupting contacts in response to receiving the fault detection signal, the interrupting contact assembly being in the open state absent the current signal flowing through the at least one electrical component.

26. The device of claim 25, wherein the at least one fault condition includes a ground fault, an arc fault, and/or a simulated fault generated by a test circuit.

27. The device of claim 25, wherein the current signal is propagated for a predetermined period of time.

28. The device of claim 27, wherein the at least one electrical component includes a fuse element that opens at the conclusion of the predetermined period of time.

29. The device of claim 28, wherein the fuse element includes a resistor.

30. An electrical wiring device comprising:
line terminals and load terminals;
at least one detection circuit coupled to the line terminals and/or the load terminals, the at least one detection circuit being configured to generate a signal in response to detecting a wiring condition wherein power is applied to the line terminals; and
an interrupting contact assembly coupled to the at least one detection circuit, the interrupting contact assembly including interrupting contacts that are configured to provide electrical continuity between the line terminals and the load terminals in a closed state and configured to interrupt the electrical continuity in an open state, the interrupting contact assembly being in the open state absent the signal being provided by the at least one detection circuit.

31. The device of claim 30, wherein the at least one detection circuit includes at least one electrical component in series with a switch an electrical component.

32. The device of claim 31, wherein the signal is a current that flows through the at least one electrical component for a predetermined period of time.

33. The device of claim 32, wherein the at least one electrical component includes a fuse element that opens at the conclusion of the predetermined period of time.

34. The device of claim 33, wherein the fuse element includes a resistor.

35. The device of claim 34, wherein the at least one detection circuit includes a fault detection circuit coupled to the line terminals and/or the load terminals, the fault detection circuit being configured to generate a fault detection signal in response to detecting at least one fault condition.

36. The device of claim 35, wherein the interrupting contacts are configured to interrupt the electrical continuity in response to the fault detection signal.

37. The device of claim 30, wherein the at least one detection circuit includes a wiring detection circuit coupled to the line terminals and/or the load terminals, the wiring detection circuit including at least one electrical component in series with a switch, the at least one electrical component being coupled to a control input of a silicon controlled rectifier, the wiring detection circuit being configured to propagate the signal through the at least one electrical component when the switch is closed and power is applied to the line terminals.

38. The device of claim 37, wherein the signal is a current that flows through the at least one electrical component for a predetermined period of time.

39. The device of claim 38, wherein the at least one electrical component includes a fuse element that opens at the conclusion of the predetermined period of time.

40. The device of claim 39, wherein the fuse element includes a resistor.

41. The device of claim 30, wherein the at least one detection circuit includes a miswire detection circuit configured to generate a miswire fault condition when power is coupled to load terminals.

42. The device of claim 41, wherein the at least one detection circuit includes a fault detection circuit coupled to the miswire detection circuit, the fault detection circuit being configured to generate a fault detection signal in response to detecting at least one fault condition, the at least one fault condition including the miswire fault condition.

43. The device of claim 42, wherein the interrupting contacts are configured to interrupt the electrical continuity in response to the fault detection signal.

44. An electrical wiring device comprising:
line terminals and load terminals;
an interrupting contact assembly coupled to the line terminals and the load terminals, the interrupting contact assembly including a trip solenoid coupled to interrupting contacts, the interrupting contacts being configured to provide electrical continuity between the line terminals and the load terminals in a reset state and interrupt the electrical continuity in an open state; and
at least one detection circuit configured to detect power coupled to the line terminals, the detection circuit permitting the interrupting contacts to be driven into the reset state without an enabling signal being received from the trip solenoid.

45. The device of claim 44, wherein the at least one detection circuit is configured to generate a signal in response to detecting power coupled to the line terminals.

46. The device of claim 45, wherein the at least one detection circuit includes a fault detection circuit coupled to the line terminals and/or the load terminals, the fault detection circuit being configured to generate a fault detection signal in response to detecting at least one fault condition.

47. The device of claim 45, wherein the interrupting contacts are configured to interrupt the electrical continuity in response to the fault detection signal.

48. The device of claim 45, wherein the at least one detection circuit includes a wiring detection circuit coupled to the line terminals and/or the load terminals, the wiring detection circuit including at least one electrical component in series with a switch, the at least one electrical component being coupled to a control input of a silicon controlled rectifier, the wiring detection circuit being configured to propagate the signal through the at least one electrical component when the switch is closed and power is applied to the line terminals.

49. The device of claim 44, wherein the at least one detection circuit includes a miswire detection circuit configured to generate a miswire fault condition when power is coupled to load terminals.

50. The device of claim 49, wherein the at least one detection circuit includes a fault detection circuit coupled to the miswire detection circuit, the fault detection circuit being configured to generate a fault detection signal in response to detecting at least one fault condition, the at least one fault condition including the miswire fault condition.

51. The device of claim 50, wherein the interrupting contacts are configured to interrupt the electrical continuity in response to the fault detection signal.

* * * * *

UNITED STATES PATENT AND TRADEMARK OFFICE
CERTIFICATE OF CORRECTION

PATENT NO. : 7,133,266 B1 Page 1 of 1
APPLICATION NO. : 10/884304
DATED : November 7, 2006
INVENTOR(S) : Finlay et al.

It is certified that error appears in the above-identified patent and that said Letters Patent is hereby corrected as shown below:

On the Title page in item 75

Please add --Thomas N. Packard, Syracuse, NY--

Signed and Sealed this

Fourth Day of September, 2007

JON W. DUDAS
*Director of the United States Patent and Trademark Office*